United States Patent [19]
Holbrook et al.

[11] 4,106,086
[45] Aug. 8, 1978

[54] VOLTAGE MULTIPLIER CIRCUIT

[75] Inventors: Mark Denton Holbrook, Belle Mead; Richard Plumb Fillmore, Plainfield, both of N.J.

[73] Assignee: RCA Corporation, New York, N.Y.

[21] Appl. No.: 755,612

[22] Filed: Dec. 29, 1976

[51] Int. Cl.² .......................................... H02M 7/00
[52] U.S. Cl. .................................................. 363/60
[58] Field of Search ................... 307/110; 363/59, 60, 363/61

[56] References Cited

U.S. PATENT DOCUMENTS

| | | | |
|---|---|---|---|
| 3,942,047 | 3/1976 | Buchanan | 363/60 X |
| 4,001,664 | 1/1977 | Hyltin | 363/59 |
| 4,053,821 | 10/1977 | Hose, Jr. et al. | 363/60 |

Primary Examiner—William M. Shoop
Attorney, Agent, or Firm—H. Christoffersen; A. L. Limberg

[57] ABSTRACT

A voltage multiplying circuit comprising a plurality of booster capacitors and switch means for first connecting the capacitors in parallel with a voltage source to charge, then reconnecting the capacitors in series with the source and in parallel with a storage capacitor, to dump the cumulative voltage into the storage capacitor, is characterized in that control signals for actuating the switch means are phased to forestall the formation of a path for leakage current that undesirably discharges the capacitors and reduces the conversion efficiency of the voltage multiplying circuit.

1 Claim, 6 Drawing Figures

VOLTAGE MULTIPLIER CIRCUIT

The present invention relates to an improvement in voltage multiplying circuits. The voltge multiplying circuits of concern are of the following type. At least one "booster" capacitor is cylically connected in parallel with a voltage source for charging during a "charging" portion of the operating cycle, and then during a "dumping" portion of the operating cycle switched into a series connection with the input voltage source across a storage capacitor. Since the potential across each booster capacitor cannot change instantaneously after switching the booster capacitor serves as an additional voltage source in it serial connection with the original voltage source, augmenting or "boosting" the potential applied to the storage capacitor. Charge is transferred to the storage capacitor ideally to charge it to —neglecting losses and other voltages reducing effects to be described —a multiple of the potential supplied by the input voltage source and thereafter to keep it charged to that level. The storage capacitor continually supplies the multiplied potential to further circuitry and its charge must be replenished to make up for the current consumed by this further circuitry. This type of voltge multiplier has been described in U.S. Pat. No. 3,824,447 issued July 16, 1974 to T. Kuwabara and entitled "Booster Circuit"; U.S. Pat. No. 3,790,812 issued Feb. 5, 1974 to P. Fry and entitled "Device For Generating A High Voltage Supply" and in copending application Ser. No. 578,913 "Voltge Amplitude Multiplying Circuits" filed May 19, 1975 by B. D. Rosenthal and A. Dingwall and assigned like the present application to RCA Corporation.

Various prior art voltage multiplying circuits utilize unidirectionally conducting elements, such as diodes, or transistors connected like diodes, in the switching means. The forward potential drops across each unidirectional conducting element undesirably interferes with the charging of the capacitors to a full mulitple of source potential and decreases the output voltage available from the voltage multiplying circuit to a value somewhat smaller than the desired multiple of input voltage. Such decreases become appreciable where the supply voltage is small, for example, on the order of 1.5 volts, in that the forward potential drops across the unidirectionally conductive elements are typically on the order of 0.5-0.7 volts.

To avoid this problem, circuits utilizing switch means consisting of transistors have been developed and are described, for example, by Rosenthal and Dingwall in the above-mentioned application Ser. No. 578,913. While such transistor circuits avoid the forward voltage drop problems associated with circuits utilizing unidirectional elements, the present inventors have noted that spurious discharge of capacitors can occur during the operation of the transistor switch means, decreasing the output voltge of the circuit below its ideal value.

The present invention provides a voltge multiplying circuit wherein suitably phasing the operation of the respective switches in the circuit forestalls the occurrence of a leakage path permitting discharge of the capacitor that undesirably lowers multiplied voltage output and reduces conversion efficiency of the voltage multiplied circuit.

Figure 1:
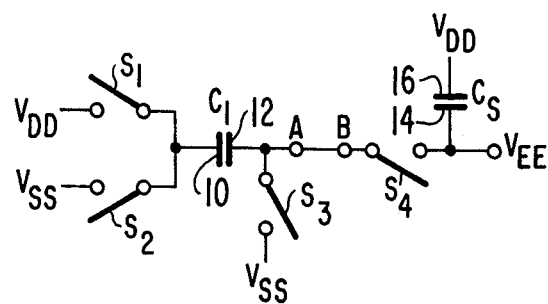
FIG. 1 is a schematic diagram of a voltage multiplying circuit.

Referring to FIG. 1, an input voltage source, not shown, supplies the relatively positive potential $V_{DD}$ and the relatively negative potential $V_{SS}$. The voltage multiplying circuit shown in FIG. 1 generates a negative output voltage $V_{EE}$ approximately twice as negative with respect to $V_{DD}$ ad $V_{SS}$. Switch means $S_1$ and $S_2$ selectively connect a first plate 10 of a booster capacitor $C_1$ to the positive and negative potentials $V_{DD}$ and $V_{SS}$, respectively. The second plate 12 of capacitor $C_1$ is selectively connected through a switch $S_3$ to the negative potential $V_{SS}$ and through a switch means $S_4$ to one plate 14 of a storage capacitor $C_S$. The other plate 16 of capacitor $C_S$ is connected to positive potential $V_{DD}$. The voltage at plate 14 of capacitor $C_S$ is taken as the output voltage $V_{EE}$.

In general, the circuit of FIG. 1 operates in a cyclical fashion, alternating between a charging mode of operation and dumping mode. In the charging mode, switch means $S_1$ and $S_3$ are closed and switch means $S_2$ and $S_4$ are open, applying $V_{DD}$ and $V_{SS}$ to plates 10 and 12, respectively, of $C_1$ —in effect paralleling $C_1$ with the input signal source supplying $V_{SS}$ and $V_{DD}$. Booster capacitor $C_1$ is perforce charged such that a potential equal to $V_{DD}$ appears at plate 10 and $V_{SS}$ at plate 12. In the dumping mode, switch means $S_1$ and $S_3$ are open and switch means $S_2$ and $S_4$ are closed to connect plate 10 of capacitor $C_1$ to the negative potential $V_{SS}$ tending to boost the potential at plate 12 of capacitor $C_1$ to $2V_{SS}$. The connection of plate 12 of $C_1$ and of plate 14 of $C_S$ permits charge to be transferred to $C_S$ to bring both plates to a potential $V_{EE}$ approaching $2V_{SS}$.

In the prior art, switch means $S_1$ thorough $S_4$ have been responsive to a single control signal, or to control signals having essentially simultaneous transitions. The present inventors have noted that such operation is disadvantageous in that all of the switch means may be momentarily conductive during the transitions providing a path for a leakage current that undesirably discharge the capacitors. For example, the output voltage of the FIG. 1 circuit is undesirably decreased by discharge of capacitors $C_1$ and $C_S$ through paths provided by concurrent conduction through switch means $S_2$ and $S_3$, and switch means $S_3$ and $S_4$, respectively. This flow of leakage current entails the consumption of energy, which is lost to the circuitry for utilizing $V_{EE}$ and reduces the conversion efficiency of the voltage multiplying circuit. High conversion efficiency is of particular importance in applications demanding low power consumption such as battery powered liquid crystal display watches.

Figure 2:
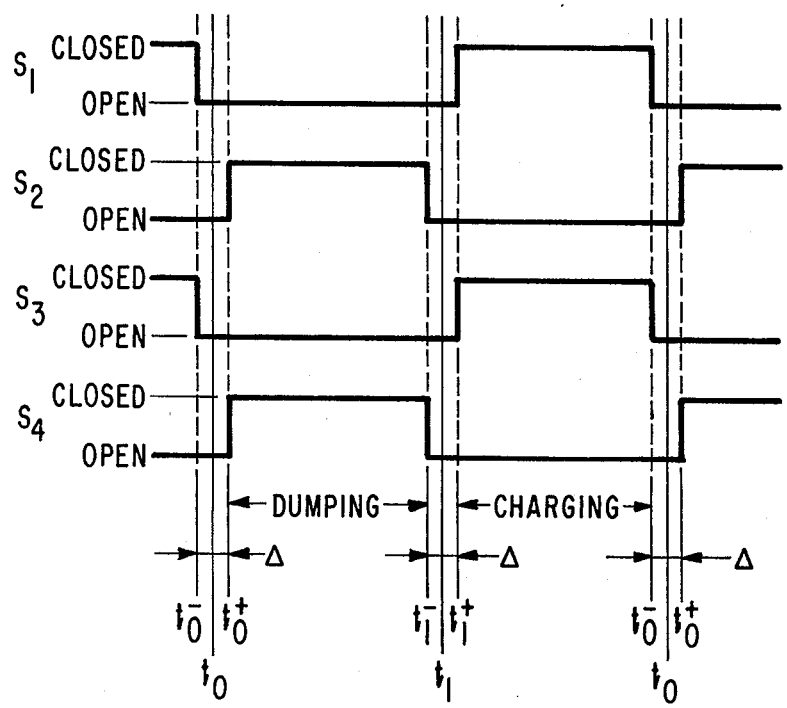
FIG. 2 is a diagram of the conduction states of the various switches of the circuit of FIG. 1 in timed relation according to the teaching of the present invention.

In accordance with one aspect of the present invention, the conversion efficiency of the voltage multiplier circuit is improved by controlling switch means $S_1$ through $S_4$ to effect two-step transitions between operational modes including an intermediate switching condition wherein all of the switch means are non-conductive. More specifically, in any operational mode transition, the following occurs: (1) all conductive switch means are rendered non-conductive to effect the intermediate switching condition; and (2) the initially non-conductive switch means are then rendered conductive. Referring to FIG. 2, in the prior art, transitions from the charging to dumping mode occur at repetitive times $t_0$, and transitions from the dumping mode to the charging mode occur at times $t_1$, with changes in the conductive states of the switch means occuring simultaneously at such times. However, in accordance with the present invention, assuming the circuit to initially be a charging mode with switch means $S_1$ and $S_3$ conductive and $S_2$ and $S_4$ non-conductive, control signals are generated to open switch means $S_1$ and $S_3$ at an instant $t_0^-$ slightly before time $t_0$, and further control signals are generated to close switch means $S_2$ and $S_4$ at an instant $t_0^+$ slightly after $t_0$. Thus, an intermediate switching condition $\Delta$ wherein all the switch means $S_1$, $S_2$, $S_3$ and $S_4$ are non-conductive is interposed between the charging and dumping conditions. Similarly, in the transistion from the dumping mode to the charging mode at time $t_1$, switch means $S_2$ and $S_4$ are opened at time $t_1^-$ an instant before time $t_1$, and switch means $S_1$ and $S_3$ are closed at a time $t_1^+$ an instant after $t_1$, to effect a two-step operational mode transition. Thus, switch means $S_1$ and $S_3$ are never concurrently closed with switch means $S_2$ and $S_4$, which forestalls the establishment of a leakage path through which an unwanted discharge of capacitors $C_1$ and $C_S$ can take place.

Referring again to FIG. 1, output voltage $V_{EE}$ can be made a larger multiple of $V_{SS}$ by breaking the connection between points A and B in the circuit and inserting therebetween further stages. Such stages comprise switch means analogous to switch means $S_1$, $S_2$ and $S_3$ and booster capacitors analogous to booster capacitor $C_1$, except with the switch means corresponding to $S_2$ connecting the capacitor to point A of the preceeding stage, rather than to negative potential $V_{SS}$. The juncture between the further stage capacitor and the switch means corresponding to $S_3$ is connected to point B, or is utilized as a "point A" and connected to the switch means corresponding to $S_2$ in a succeeding further stage. The switch means of the additional stages are operated in synchronism with their respective corresponding switch means $S_1$, $S_2$ or $S_3$ in the first stage.

Figure 3:
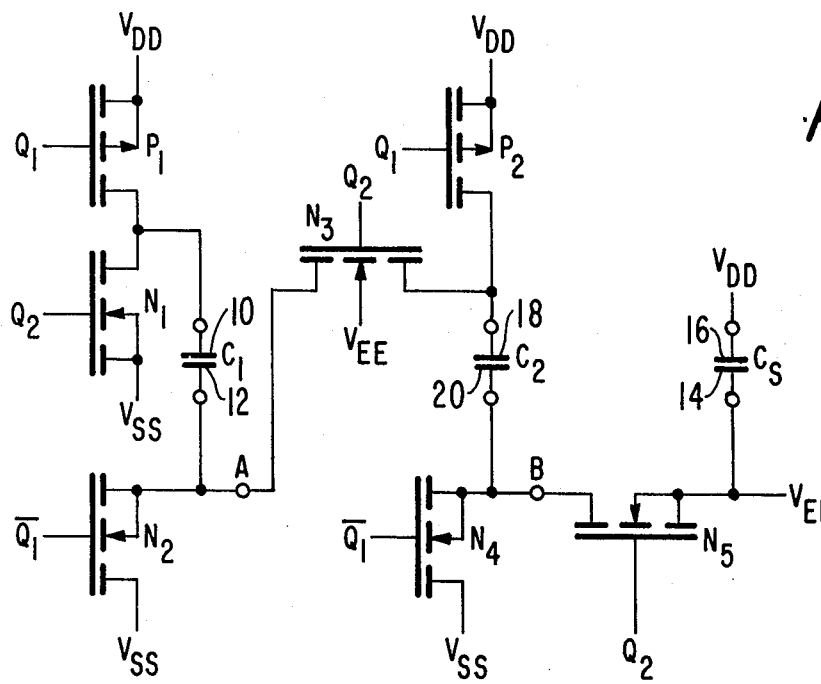
FIG. 3 is a schematic diagram of a FET voltage tripler.

Switch means $S_1$ through $S_4$ and any switches used in additional stages, may be any electronically controlled switch means such as, for example, insulated-gate-field-effect transistors (IGFET's) of the enhancement or depletion type formed in bulk silicon, bipolar transistors, or transistors formed on an insulator substrate. A voltage tripler utilizing enhancement type IGFET's is shown in FIG. 3. Like reference characters in FIG. 1 and 3 denote like components. Transistors of P-conductivity type are formed in an N substrate, and are identified in the drawing by the letter P followed by a reference numeral. Transistors of N conductivity type are formed in P-wells diffused into the N-substrate, and are identified by the letter N followed by a reference numeral. In general, the respective substrates of P-conductivity type and N-conductivity type transistors should be connected to potentials, greater than or equal to the most positive and less than or equal to the most negative potentials, respectively, applied to the source or drain of the particular transistor. As is well known, IGFET's have first and second electrodes, termed source and drain, which define the ends of a conduction path, the conductivity of which is controlled by the potential applied to a control electrode, the gate. It should be appreciated that the respective first and second electrodes may exchange operations as the source or drain. The source electrode is defined as the first or second electrode having, in a P-type IGFET, the highest potential, and in an N-type IGFET the lowest potential, applied thereto. For conduction to occur the applied gate-to-source potential ($V_{GS}$) must be in a direction to forward bias the gate with respect to the source and must be greater in magnitude than the threshold voltage ($V_T$) of the transistor. In the circuit of FIG. 3, transistor $P_1$ serves as switch means $S_1$, having source electrode connected to $V_{DD}$ and drain connected to plate 10 of capacitor $C_1$. Transistor $N_1$, having source connected to $V_{SS}$ and drain connected to plate 10 of capacitor $C_1$, serves as switch means $S_2$. Similarly, the function of switch means $S_3$ is provided by transistor $N_2$ having drain coupled to $V_{SS}$ and source connected to plate 12 of capacitor $C_1$. A second stage comprising transistors $P_2$, $N_3$ and $N_4$ and capacitor $C_2$ is utilized in the tripler. The source and substrate of transistor $P_2$ are connected to $V_{DD}$, and the drain thereof is connected to plate 18 of capacitor $C_2$. Transistor $N_3$ has its drain connected to point A, whereby the first and second stages of the tripler are connected and has its source connected to plate 18 of capacitor $C_2$. The substrate of transistor $N_3$ has $V_{EE}$ applied thereto (from plate 14 of capacitor $C_S$). The second plate 20 of capacitor $C_2$ is connected to point B and to the source and substrate of transistor $N_4$, the drain of which is connected to $V_{SS}$. Transistor $N_5$ serves as switch means $S_4$, the drain thereof being connected to point B and the substrate and source thereof being connected to plate 14 of capacitor $C_S$. Transistors $P_1$ and $P_2$ are controlled by the application at their respective gates of a control signal $Q_1$; transistors $N_1$, $N_3$ and $N_5$ by application at their gates of a control signal $Q_2$; and transistors $N_2$ and $N_4$ are controlled by application at their gates of a control signal $\overline{Q_1}$. The control signals $Q_1$, $\overline{Q_1}$ and $Q_2$ are illustrated in FIG. 6, and are generated, for example, by a circuit such as that illustrated in FIG. 5, as will hereinafter be explained. The control signals alternate between relatively positive potential $V_{DD}$ and relatively negative potential $V_{EE}$. Signal $Q_1$ has positive-going and negative-going transitions at times $t_0^-$ and $t_1^+$ respectively. Signal $Q_2$, on the other hand, has positive-going and negative-going transitions at $t_0^+$ and $t_1^-$, respectively. Signal $\overline{Q_1}$ is the complement of signal $Q_1$.

Figure 4:
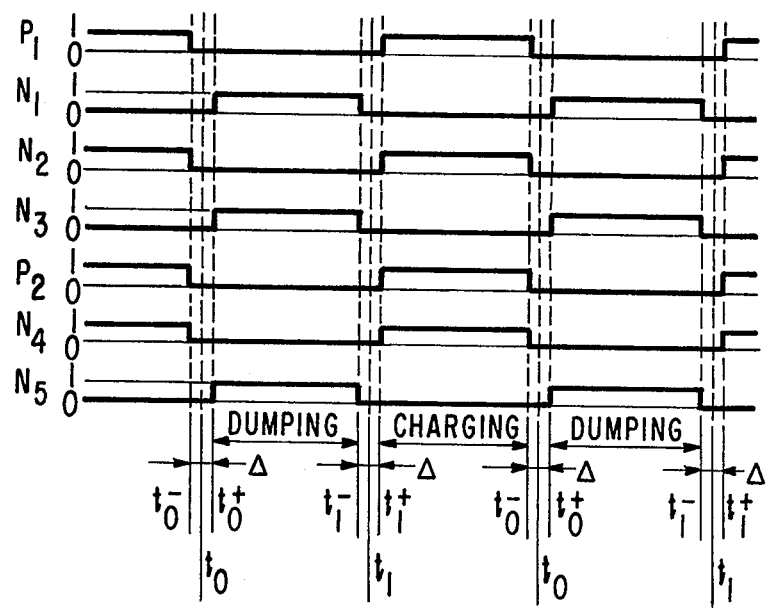
FIG. 4 is a diagram of the conduction states of the various transistors of FIG. 3 as controlled in accordance with the present invention.

Referring to FIGS. 3 and 4 and to the diagrams of control signals $Q_1$, $\overline{Q_1}$ and $Q_2$ in FIG. 6, the operation of the voltage tripler in FIG. 3 will be explained. In FIG. 4, a conductive state is indicated by a level 1 and a non-conductive state indicated by level 0. Assuming the circuit to be initially in the charging mode, $Q_1$ and $Q_2$ are at low level, and accordingly, transistors $P_1$, $N_2$, $P_2$ and $N_4$ are conductive and transistors $N_1$, $N_3$ and $N_5$ are non-conductive. Thus, during the charging mode, capacitor boosters $C_1$ and $C_2$ are, in effect, coupled in parallel between the positive potential $V_{DD}$ and negative potential $V_{SS}$, and are isolated from capacitor $C_S$. Capacitors $C_1$ and $C_2$ are thus charged such that potential $V_{DD}$ appears at plates 10 and 18 and potential $V_{SS}$ appears at plates 12 and 20. The time constants of the circuit are such that the capacitors have attained essentially full charge within the charging period. At instant $t_0^-$ a two-step transition to the dumping mode is initiated. Control signal $Q_1$ undergoes a positive-going transition, causing transistors $P_1$, $N_2$, $P_2$ and $N_4$ to become non-conductive. Thus, for a period beginning at $t_0^-$ all of the transistors in the circuit are rendered non-conductive and the intermediate switching state is assumed. At time $t_0^+$, however, control signal $Q_2$ undergoes a positive-going transition, causing transistors $N_1$, $N_3$ and $N_5$ to become conductive. The dumping mode of operation is thereby effected wherein: plate 10 of capacitor $C_1$ is connected to negative potential $V_{SS}$, plate 12 of capacitor $C_1$ is connected to plate 18 of capacitor $C_2$, and plate 20 of capacitor $C_2$ is connected to plate 14 of capacitor $C_S$. Since the voltage across a capacitor cannot change instantaneously, capacitors $C_1$ and $C_2$ each operate during transfer of charge to $C_S$, in effect, as batteries supplying a potential ideally of value $V_{DD} - V_{SS}$. So the total potential, with respect to $V_{DD}$ that appears across capacitor $C_S$ is boosted to a potential approaching $3V_{SS}$ as referred to $V_{DD}$.

At time $t_1^-$ a two-step transition back to the charging mode is initiated. Control signal $Q_2$ undergoes a negative-going transition, causing transistors $N_1$, $N_3$ and $N_5$ to become non-conductive, thereby instituting the intermediate switching condition wherein all switch means are non-conductive. At time $t_1^+$, control signal $Q_1$ undergoes a negative-going transition causing transistors $P_1$, $N_2$, $P_2$ and $N_4$ to become conductive, completing the transition to the charging mode. Controlling transistors $P_1$, $P_2$, $N_1$, $N_2$, $N_3$, $N_4$ and $N_5$ in the manner described above prevents leakage paths permitting unwanted discharge of the capacitors.

Figure 5:
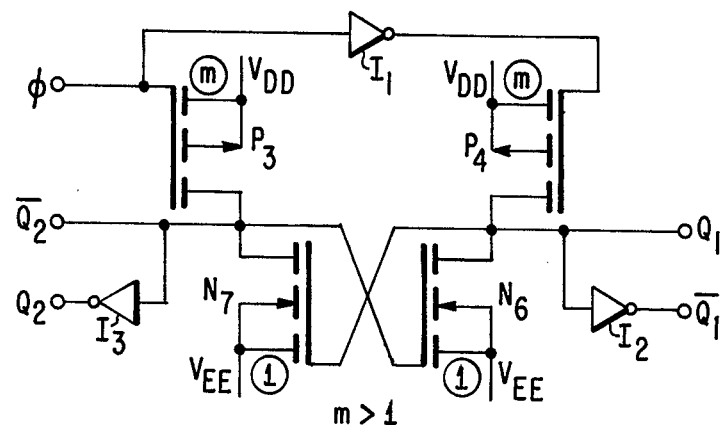
FIG. 5 is a schematic diagram of one embodiment of a circuit for providing control signals in accordance with the present invention.
Figure 6:
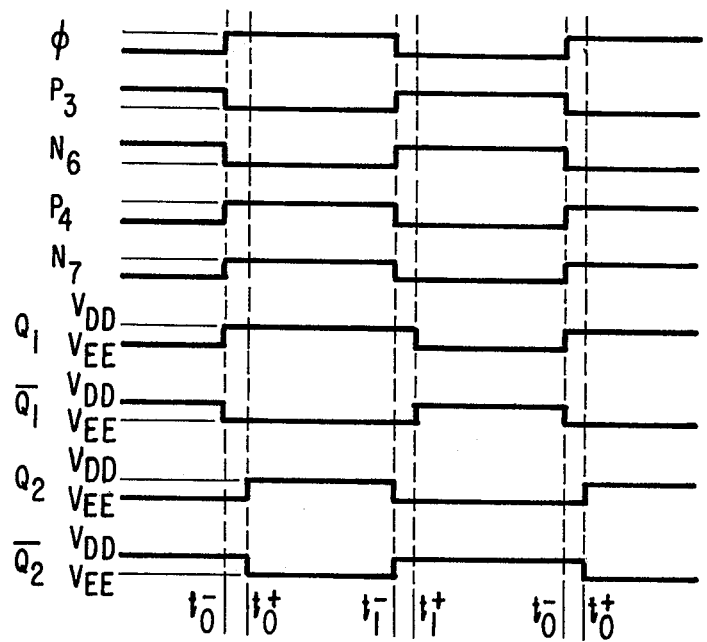
FIG. 6 is a diagram of the conduction states of the transistors of the circuit of FIG. 5 and waveforms of the control signals generated thereby.

A circuit for generating control signals $Q_1$, $\overline{Q_1}$ and $Q_2$ is shown in FIG. 5 with the waveform of an input clock signal $\phi$ applied thereto, and the conduction states of the transistors of the circuit being shown in FIG. 6 along with the waveforms of the control signals generated. Clock signal $\phi$ is preferably a rectangular wave having positive-going transitions at times $t_0^-$ and negative-going transitions at time $t_1^-$. Clock signal $\phi$ is applied to the gate of a transistor $P_3$ and through a conventional CMOS inverter $I_1$ to the gate of transistor $P_4$. The respective sources and substrates of transistors $P_3$ and $P_4$ are connected to positive potential $V_{DD}$. The drains of transistors $P_3$ and $P_4$ are respectively coupled to the gates of transistors $N_6$ and $N_7$, respectively. The respective sources and substrates of transistors $N_6$ and $N_7$ are connected to negative potential $V_{EE}$, that is, to plate 14 of capacitor $C_S$ in FIG. 3. The drain of transistor $N_6$ is connected to the interconnection of the drain of transistor $P_4$ and gate of transistor $N_7$. Similarly, the drain of transistor $N_7$ is connected to the interconnection of the drain of transistor $P_3$ and the gate of transistor $N_6$. As will be hereinafter explained, control signals $Q_1$ and $\overline{Q_1}$ are developed at the interconnected drains of transistors $P_4$ and $N_6$, and $\overline{Q_2}$ at the interconnected drains of transistors $P_3$ and $N_7$. Control signals $\overline{Q_1}$ and $Q_2$ are respectively provided by inverting, via inverters $I_2$ and $I_3$, the $Q_1$ and $\overline{Q_2}$ signals.

Transistors $P_3$ and $P_4$ have a transconductance that is m times as large as that of transistors $N_6$ and $N_7$, m being larger than 1, which is essential to the proper operation of the FIG. 5 control signal generator. (The encircled numerals near the source electrodes of $P_3$, $P_4$, $N_6$ and $N_7$ indicate the relative sizes of their transconductances.) The higher-transconductance transistor $P_3$ can respond to a source-to-gate potential with amplitude equal to the difference between $V_{SS}$ and $V_{DD}$ to change the charge on the interconnection of its drain electrode and that of lower-transconductance transistor $N_7$ at a relatively rapid rate compared with the rate the lower-transconductance transistor $N_7$ can change the charge when a source-to-gate potential of $V_{DD} - V_{EE}$ amplitude is applied to it rather than to $P_3$. Similarly, higher-transconductance transistor $P_4$ can respond to a source-to-gate potential with amplitude equal to the difference between $V_{SS}$ and $V_{DD}$ to change the charge on the interconnection of its drain electrode and that of lower-transconductance transistor $N_6$ at a relatively rapid rate compared with the rate the lower-transconductance transistor $N_6$ can when a source-to-gate potential of $V_{DD} - V_{SS}$ amplitude is applied to it rather than to $P_4$.

Referring to FIGS. 5 and 6, the operation of the circuit of FIG. 5 will be explained. It is assumed that inverters $I_1$, $I_2$ or $I_3$ exhibit no appreciable delay. The circuit is taken to be initially in the condition wherein $\phi$ is low, transistors $P_3$ and $N_6$ conductive and $P_4$ and $N_7$ non-conductive. At time $t_0^-$, clock $\phi$ undergoes a positive-going transition. Transistors $P_3$ and $P_4$ are thereby rendered conductive and non-conductive, respectively. When transistor $P_4$ is rendered conductive, control signal $Q_1$ undergoes a nearly instantaneous transition from $V_{EE}$ to $V_{DD}$. With $V_{DD}$ applied to its gate and transistor $P_3$ non-conductive, transistor $N_7$ becomes conductive, causing a slow transition in control signal $\overline{Q_2}$ from $V_{DD}$ to $V_{EE}$. Thus, the negative-going transition in control signal $\overline{Q_2}$ does not, in effect, occur until time $t_0^+$.

At $t_1^-$, clock $\phi$ undergoes a negative-going transition. Transistors $P_3$ and $P_4$ are thereby rendered conductive and non-conductive, respectively. With $V_{DD}$ applied at its gate and $P_4$ non-conductive, $N_6$ becomes conductive, and $N_7$, with the positive potential removed from its gate, becomes non-conductive. Control signal $\overline{Q_2}$, therefore, undergoes a relatively instantaneous positive-going transition from $V_{EE}$ to $V_{DD}$. The change in control signal $Q_1$, however, is effected by the conduction in high-impedance $N_6$, and therefore the transition in $Q_1$ is, in effect, delayed by a predetermined period to time $t_1^+$. Thus, control signal $Q_1$ has positive-going transitions at times $t_0^-$ and negative-going transitions at times $t_1^+$ and control signal $Q_2$ (compliment of $\overline{Q_2}$) has positive-going transitions at time $t_0^+$ and negative-going transitions at time $t_1^-$.

While the voltage multiplying circuits shown in FIGS. 1 and 3 operate by generating a multiplied negative potential, the circuits can be modified to produce a multiplied positive potential. In the case of FIG. 1, the respective positive and negative potential sources can be interchanged to develop a multiplied positive potential relative to $V_{DD}$ across capacitor $C_S$. In the case of FIG. 3, the interchanging of potentials can be effected by replacing the transistors with their respective complementary types and applying the complement of the respective control signals shown in FIG. 3.

What is claimed is:

1. In a voltage multiplier circuit comprising a source of input voltage, a storage capacitor across which output voltage that is a multiple of input voltage is made available, at least one booster capacitor, control signal generator means for cyclically generating a first control signal followed by a second control signal, said first and said second control signals for governing charging and dumping portion of an operating cycle respectively, a first set of electronically controlled switch means conductive responsive to said first control signal to connect each booster capacitor across said source of input voltage for charging and being otherwise non-conductive, and a second set of electronically controlled switch means conductive responsive to said second control signal to connect each booster capacitor in series with said source of input voltage across said storage capacitor for transferring charge to said storage capacitor and being otherwise non-conductive, the improvement wherein said control signal generator is of a type for providing an interval between said first and second control signals in each cycle and for providing an interval between said second control signal in each cycle and the first control signal in the succeeding cycle.

* * * * *

Disclaimer 4,106,086.—*Mark Denton Holbrook*, Belle Mead, and *Richard Plumb Fillmore*, Plainfield, N.J. VOLTAGE MULTIPLIER CIRCUIT. Patent dated Aug. 8, 1978. Disclaimer filed Apr. 20, 1979, by the assignee *RCA Corporation*.

Hereby enters this disclaimer to all claims of said patent.

[*Official Gazette June 19, 1979.*]